United States Patent
Figgins et al.

(10) Patent No.: US 10,923,975 B2
(45) Date of Patent: Feb. 16, 2021

(54) LAMINATED ROTOR WITH IMPROVED MAGNET ADHESION AND METHOD OF FABRICATING

(71) Applicant: Regal Beloit America, Inc., Beloit, WI (US)

(72) Inventors: Daniel S. Figgins, Fort Wayne, IN (US); Jeffrey A. Hall, Fort Wayne, IN (US)

(73) Assignee: REGAL BELOIT AMERICA, INC., Beloit, WI (US)

(*) Notice: Subject to any disclaimer, the term of this patent is extended or adjusted under 35 U.S.C. 154(b) by 400 days.

(21) Appl. No.: 15/582,017

(22) Filed: Apr. 28, 2017

(65) Prior Publication Data

US 2017/0237308 A1   Aug. 17, 2017

Related U.S. Application Data

(63) Continuation of application No. 13/778,574, filed on Feb. 27, 2013, now abandoned.

(51) Int. Cl.
*H02K 1/27* (2006.01)
*H02K 15/03* (2006.01)
*H02K 1/30* (2006.01)

(52) U.S. Cl.
CPC ............. *H02K 1/30* (2013.01); *H02K 1/2706* (2013.01); *H02K 1/2753* (2013.01); *H02K 15/03* (2013.01); *Y10T 29/49012* (2015.01)

(58) Field of Classification Search
CPC .... H02K 1/2706; H02K 1/2753; H02K 1/278; H02K 15/03; B32B 15/04

USPC ........ 310/156.12, 156.21, 216.016, 216.017, 310/216.065
See application file for complete search history.

(56) References Cited

U.S. PATENT DOCUMENTS

| | | | |
|---|---|---|---|
| 3,204,134 A * | 8/1965 | Schneider | H02K 1/28 310/216.137 |
| 4,823,033 A | 4/1989 | Fujiwara et al. | |
| 4,910,861 A | 3/1990 | DoHogne | |
| 4,954,736 A | 9/1990 | Kawamoto et al. | |
| 5,200,662 A * | 4/1993 | Tagami | H02K 1/2773 310/156.61 |
| 5,894,183 A | 4/1999 | Borchert | |

(Continued)

FOREIGN PATENT DOCUMENTS

DE   102005046285 A1 *  8/2006  ............ H02K 15/00
JP       2005332976 A  * 12/2005

OTHER PUBLICATIONS

Ueda, Machine Translation of JP2005332976, Dec. 2005 (Year: 2005).*

(Continued)

*Primary Examiner* — Quyen P Leung
*Assistant Examiner* — Eric Johnson
(74) *Attorney, Agent, or Firm* — Armstrong Teasdale LLP

(57) ABSTRACT

A moisture resistant rotor sleeve includes a plurality of stacked laminations forming a sleeve having an outer periphery, an inner periphery, and spaces between adjacent laminations. The rotor sleeve also includes a sealant coupled to the inner periphery such that the outer periphery is free of sealant. The sealant seals the spaces to prevent fluid from traveling through the spaces of the sleeve between the inner periphery and the outer periphery.

12 Claims, 6 Drawing Sheets

(56) References Cited

U.S. PATENT DOCUMENTS

| | | | |
|---|---|---|---|
| 8,943,677 B2* | 2/2015 | Gerster | C21D 8/12 |
| | | | 29/417 |
| 8,975,800 B2 | 3/2015 | Riedl et al. | |
| 2004/0253465 A1 | 12/2004 | Namiki et al. | |
| 2005/0067915 A1* | 3/2005 | Ida | H02K 1/04 |
| | | | 310/216.065 |
| 2006/0043811 A1* | 3/2006 | Ong et al. | H02K 1/278 |
| | | | 310/156.08 |
| 2006/0066168 A1* | 3/2006 | Shoykhet | H02K 15/12 |
| | | | 310/211 |
| 2006/0284506 A1* | 12/2006 | Kim | H02K 1/2733 |
| | | | 310/156.13 |
| 2007/0132335 A1* | 6/2007 | Ionel | H02K 1/28 |
| | | | 310/261.1 |
| 2007/0222326 A1 | 9/2007 | Ionel et al. | |
| 2009/0123308 A1 | 5/2009 | Taniwa et al. | |
| 2010/0045132 A1 | 2/2010 | Zaps | |
| 2010/0164308 A1 | 7/2010 | Zapf | |
| 2012/0014823 A1* | 1/2012 | Riedl | H02K 15/02 |
| | | | 417/423.12 |
| 2012/0049684 A1 | 3/2012 | Bodenstein et al. | |
| 2012/0057999 A1 | 3/2012 | Fukasaku et al. | |
| 2012/0261058 A1 | 10/2012 | Rippel et al. | |
| 2013/0008422 A1 | 1/2013 | Kasashima et al. | |
| 2013/0022833 A1* | 1/2013 | Wakade | C22C 38/004 |
| | | | 428/611 |
| 2013/0257184 A1 | 10/2013 | Haga et al. | |
| 2014/0197703 A1* | 7/2014 | Chamberlin | H02K 9/22 |
| | | | 310/64 |

OTHER PUBLICATIONS

Three Bond 3732 Technical Data, 2016 (Year: 2016).*
dictionary.com, adhesive definition, 2020 (Year: 2020).*
dictionary.com, sealant definition, 2020 (Year: 2020).*
Gornott, Machine Translation of DE102005046285, Aug. 2006 (Year: 2006).*

* cited by examiner

LAMINATED ROTOR WITH IMPROVED MAGNET ADHESION AND METHOD OF FABRICATING

CROSS-REFERENCE TO RELATED APPLICATIONS

This application is a continuation application of U.S. patent application Ser. No. 13/778,574, filed Feb. 27, 2013, which is hereby incorporated by reference in its entirety

BACKGROUND OF THE INVENTION

The field of the invention relates generally to electric motors and, more particularly, to sealed laminated rotor sleeves.

Various types of electric machines include permanent magnets. For example, a brushless direct current (BLDC) motor may include a plurality of permanent magnets coupled to an exterior surface of a rotor core. Typically, the permanent magnets are coupled to the exterior surface of the rotor core using an adhesive. This coupling between the permanent magnets and the rotor core must resist forces exerted on the permanent magnets during high speed rotation tending to separate the permanent magnets from the rotor.

Some known rotor cores include laminated rotor sleeves. Under certain environmental conditions, permanent magnets may not remain adhered to the rotor sleeve with the desired level of reliability due to gaps in the laminations exposing the adhesive bond to the environment. Other known rotor cores utilize a solid sleeve instead of a laminated sleeve and exhibit improved bond performance. However, such solid sleeve rotor cores are typically more expensive than laminated sleeve rotor cores. Accordingly, there is a need for a laminated sleeve rotor core with improved resistance to the environment and improved magnet adhesion.

BRIEF DESCRIPTION OF THE INVENTION

In one aspect, a moisture resistant rotor sleeve is provided. The rotor sleeve includes a plurality of stacked laminations forming a sleeve having an outer periphery, an inner periphery, and spaces between adjacent laminations. The rotor sleeve also includes a sealant coupled to the inner periphery such that the outer periphery is free of sealant. The sealant seals the spaces to prevent fluid from traveling through the spaces of the sleeve between the inner periphery and the outer periphery.

In another aspect, a rotor is provided. The rotor includes a shaft, a hub coupled to the shaft, and a plurality of stacked laminations forming a sleeve having an outer periphery, an inner periphery, and spaces between adjacent laminations, wherein the sleeve is coupled to the hub. The rotor also includes a sealant coupled to the inner periphery such that the outer periphery is free of sealant. The sealant seals the spaces to prevent fluid from traveling through the spaces of the sleeve between the inner periphery and the outer periphery.

In yet another aspect, a method of fabricating a moisture resistant rotor sleeve is provided. The method includes providing a sleeve formed from a plurality of stacked laminations. The sleeve has an outer periphery, an inner periphery, and spaces between adjacent laminations. The method also includes applying a sealant in the spaces between adjacent laminations and to the inner periphery to form a sealed sleeve. The outer periphery of the sealed sleeve is free of sealant. The sealant facilitates sealing the spaces between adjacent laminations to prevent air from traveling through the spaces of the sleeve between the inner periphery and the outer periphery.

DETAILED DESCRIPTION OF THE INVENTION

Some electric motors typically include a stator and a rotor having permanent magnets adhered thereto. Motor stators can be formed by stamping laminations from a sheet, which results in leftover material in the center of the stamping. This leftover material can be further stamped into rotor laminations to construct a rotor core. As such, utilizing the leftover material can provide an economic savings compared to purchasing a rotor core manufactured with steel tubing or powdered metal. However, laminated rotor cores typically include gaps between the laminations, which may allow moisture to travel through the gaps and weaken the adhesive bond between the laminated rotor core and the permanent magnets, resulting in magnet detachment and motor failure. The systems and methods described herein provide a laminated rotor with improved resistance to moisture exposure.

Figure 1:
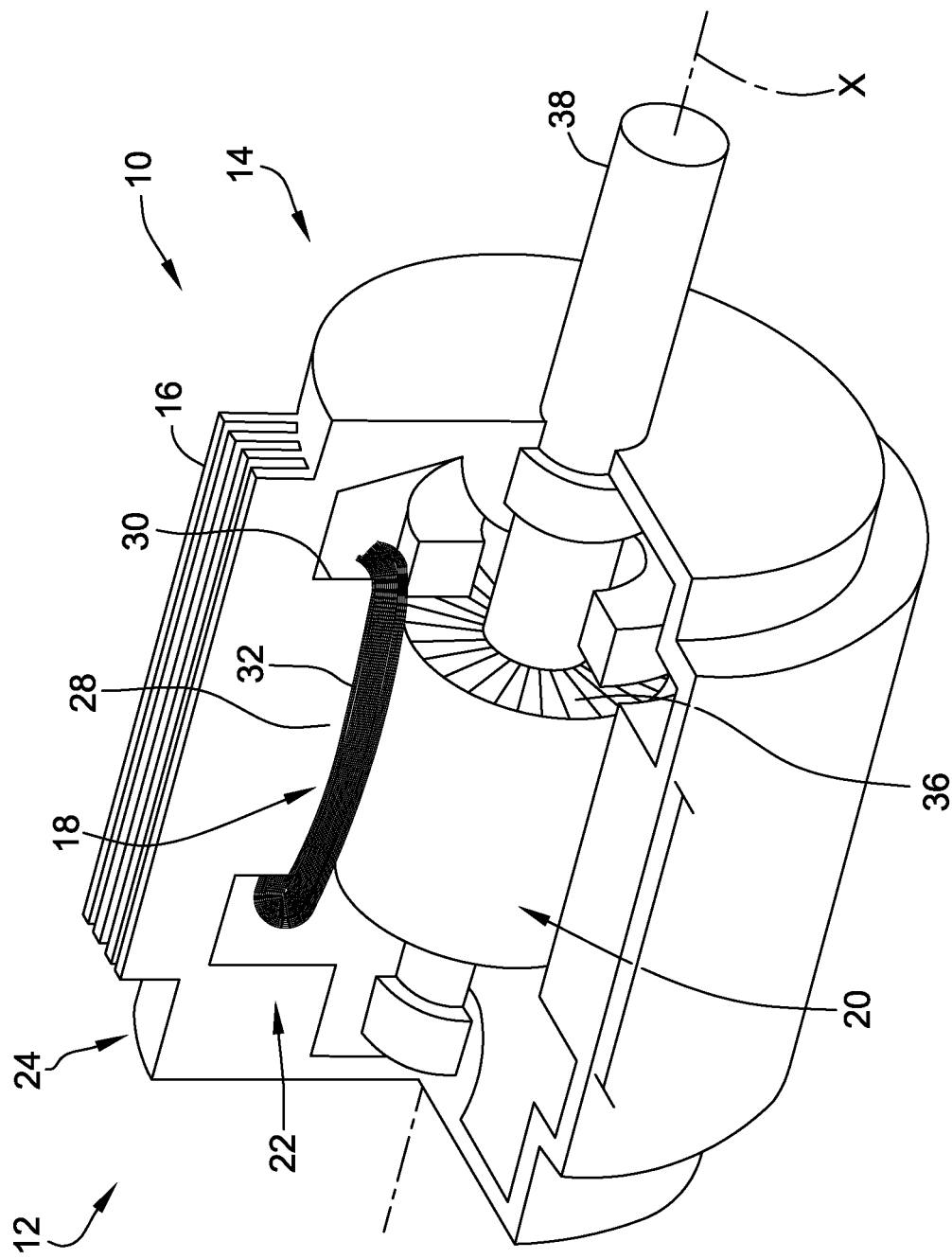
FIG. 1 is a perspective cut-away view of an exemplary electric machine.

FIG. 1 is a perspective cut-away view of an exemplary electric motor 10. Although referred to herein as electric motor 10, electric motor 10 can be operated as either a generator or a motor. Electric motor 10 includes a first end 12, a second end 14, and a motor assembly housing 16. Electric motor 10 also includes a stationary assembly 18 and a rotatable assembly 20. Motor assembly housing 16 defines an interior 22 and an exterior 24 of motor 10 and is configured to at least partially enclose and protect stationary assembly 18 and rotatable assembly 20. Stationary assembly includes a stator core 28, which includes a plurality of teeth 30 and a plurality of windings 32 wound around stator teeth 30. Stator core 28 may include any number of teeth 30 that enables motor 10 to function as described herein, for example, stator core 28 may have nine teeth. Furthermore, in an exemplary embodiment, stator core 28 is formed from a stack of laminations made of highly magnetically permeable material. Stationary assembly 18 may be a round, segmented, or roll-up type stator construction and windings 32 are wound on stator core 28 in any suitable manner that enables motor 10 to function as described herein.

Rotatable assembly 20 includes a permanent magnet rotor core 36 and a shaft 38. In the exemplary embodiment, rotor core 36 is formed from a stack of laminations made of magnetically permeable material. Rotor core 36 is substantially received in a central bore of stator core 28 for rotation along an axis of rotation X. FIG. 1 illustrates rotor core 36 and stator core 28 as solid for simplicity.

In the exemplary embodiment, electric motor 10 is coupled to a fan or centrifugal blower (not shown) for moving air through an air handling system, for blowing air over cooling coils, and/or for driving a compressor within an air conditioning/refrigeration system. More specifically, motor 10 may be used in air moving applications used in the heating, ventilation, and air conditioning (HVAC) industry, for example, in residential applications using ⅕ horsepower (hp) to 1 hp motors. Alternatively, motor 10 may be used in fluid pumping applications. Motor 10 may also be used in commercial and industrial applications and/or hermetic compressor motors used in air conditioning applications, where motor 10 may have a rating of greater than 1 hp. Although described herein in the context of an air handling system, electric motor 10 may engage any suitable work component and be configured to drive such a work component.

Figure 2:
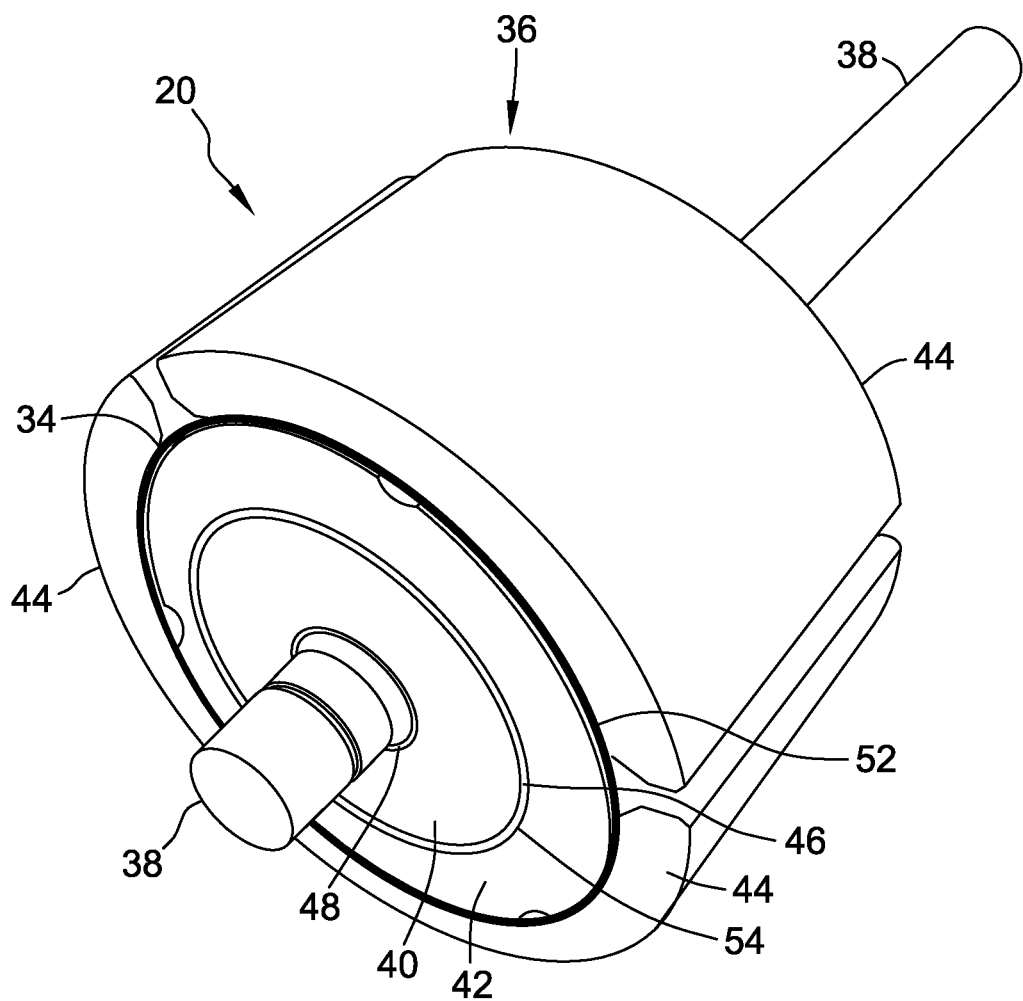
FIG. 2 is a perspective view of an exemplary rotor core that may be used with the machine shown in FIG. 1.

FIG. 2 illustrates exemplary rotatable assembly 20 having rotor core 36 and shaft 38. Rotor core 36 includes a hub 40, a rotor sleeve 42, and permanent magnets 44. Hub 40 includes an outer periphery or diameter 46 and an inner periphery or diameter 48 coupled to shaft 38. Rotor sleeve 42 is formed from a plurality of laminations 50 (shown in FIG. 3) and includes an outer periphery or diameter 52 and an inner periphery or diameter 54, which is coupled to hub outer diameter 46. Although described herein as substantially circular, rotor sleeve outer and inner peripheries 52, 54 may have any suitable shape that enables motor 10 to function as described herein. Laminations 50 are either interlocked or loose and are fabricated from, for example, multiple punched layers of stamped metal such as steel. Permanent magnets 44 are coupled to rotor sleeve outer diameter 52 by any suitable adhesive 34 and, in the exemplary embodiment, rotor core 36 includes three permanent magnets 44. Alternatively, rotor core 36 may include any number of permanent magnets 44 that enables rotor core 36 to function as described herein.

Figure 3:
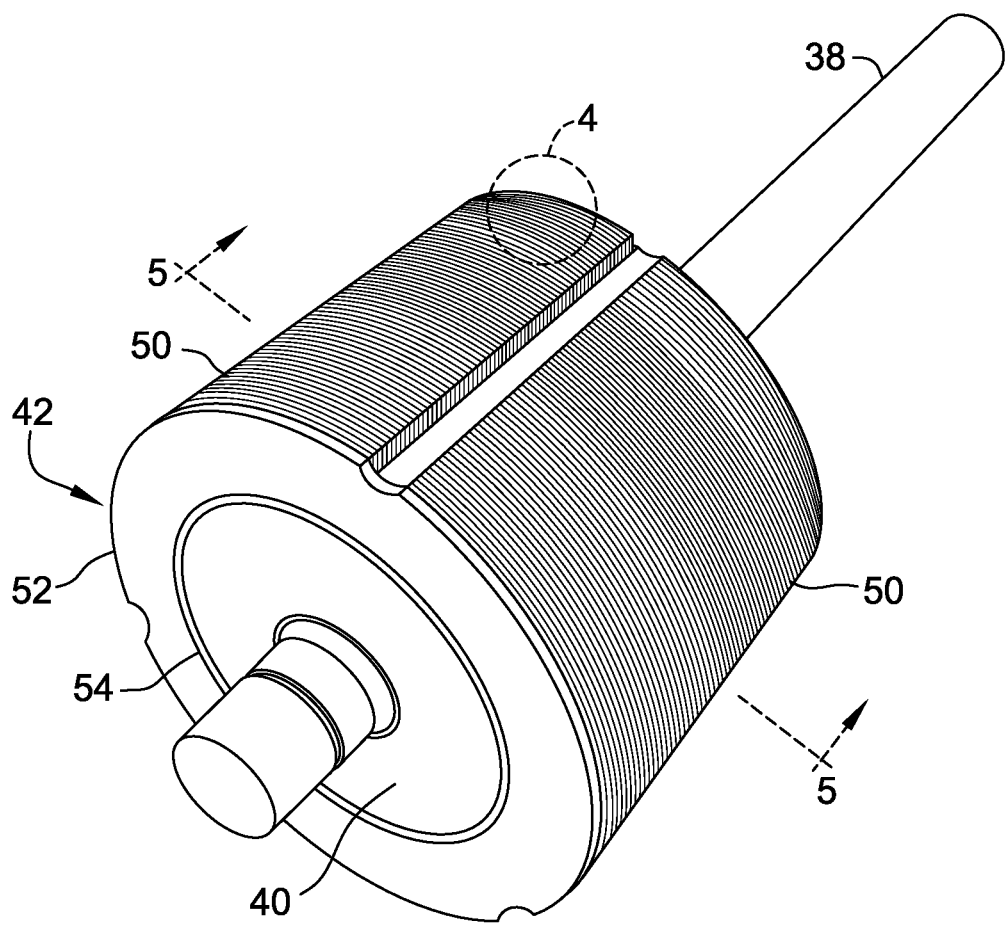
FIG. 3 is a perspective view of a portion of the rotor core shown in FIG. 2.
Figure 4:
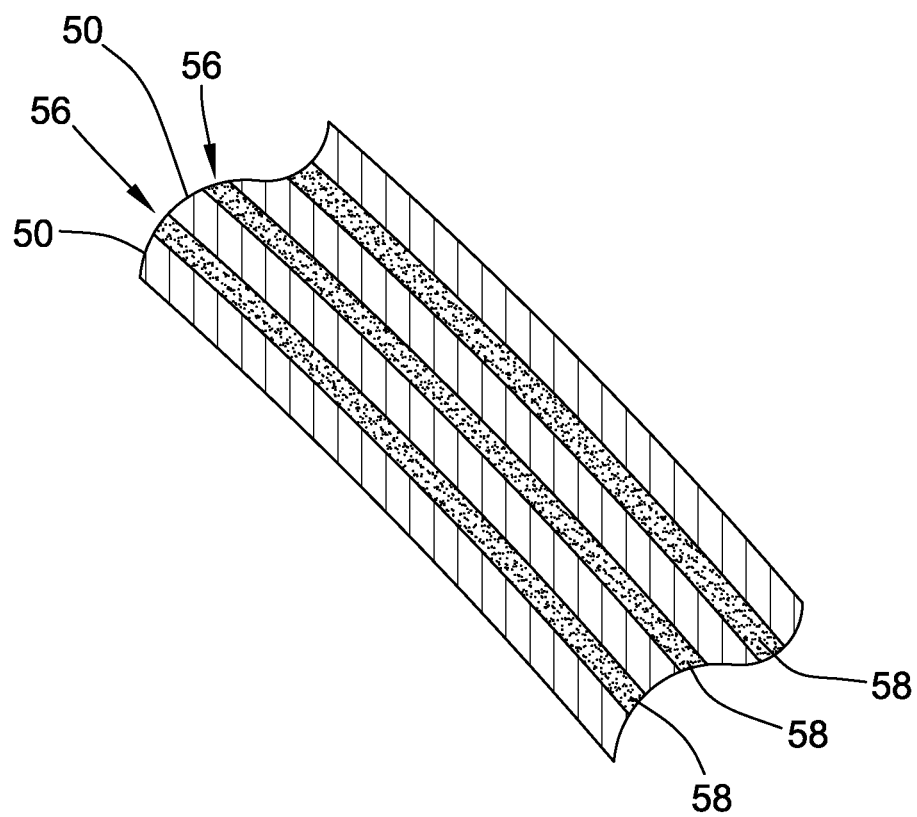
FIG. 4 is a detailed view of section 4 shown in FIG. 3.

FIGS. 3 and 4 illustrate exemplary rotor sleeve 42 formed by a stack of pressed laminations 50. Even though laminations 50 are pushed close together, small gaps 56 remain between adjacent laminations 50. In some environments, such as high humidity environments, air and moisture may enter rotor core 36 and travel from sleeve inner diameter 54 to sleeve outer diameter 52 via gaps 56. Air and moisture reaching sleeve outer diameter 52 (i.e., the interface or bond area between sleeve outer diameter 52 and permanent magnets 44) may degrade adhesive 34, thereby weakening the bond between sleeve 42 and permanent magnet 44.

In the exemplary embodiment, a sealant 58 is applied in gaps 56 between adjacent laminations 50 to facilitate preventing air and moisture from traveling through gaps 56 between sleeve inner diameter 54 and sleeve outer diameter 52. As such, sealant 58 seals gaps 56 and facilitates preventing air and moisture from reaching adhesive 34 and affecting the bond between permanent magnets 44 and sleeve 42. In the exemplary embodiment, sealant 58 is a material such as a varnish, an anaerobic wicking grade thread locker, a casting porosity sealant, a polyurethane, an ultraviolet light curing sealant, a caulking or rubberized sealant, and/or an enamel paint. Alternatively, sealant 58 may be any material that enables rotor core 36 to function as described herein.

Figure 5:
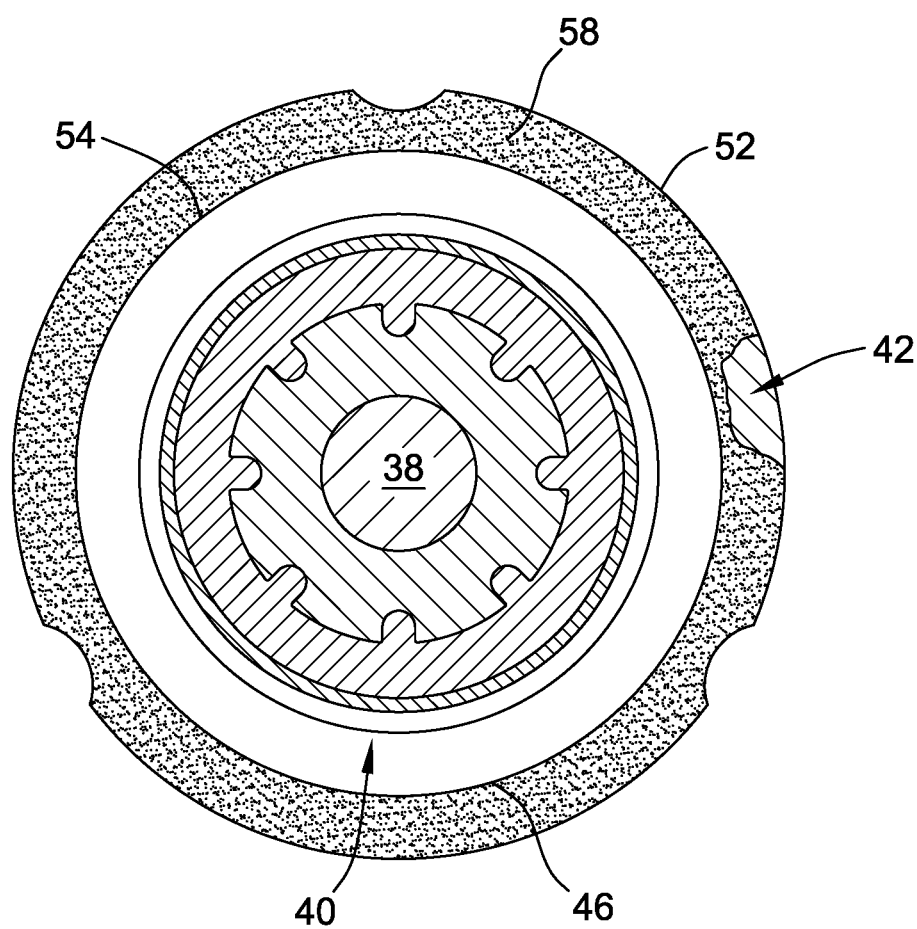
FIG. 5 is a cross-sectional view of the rotor shown in FIG. 3 and taken along line 5-5.
Figure 6:
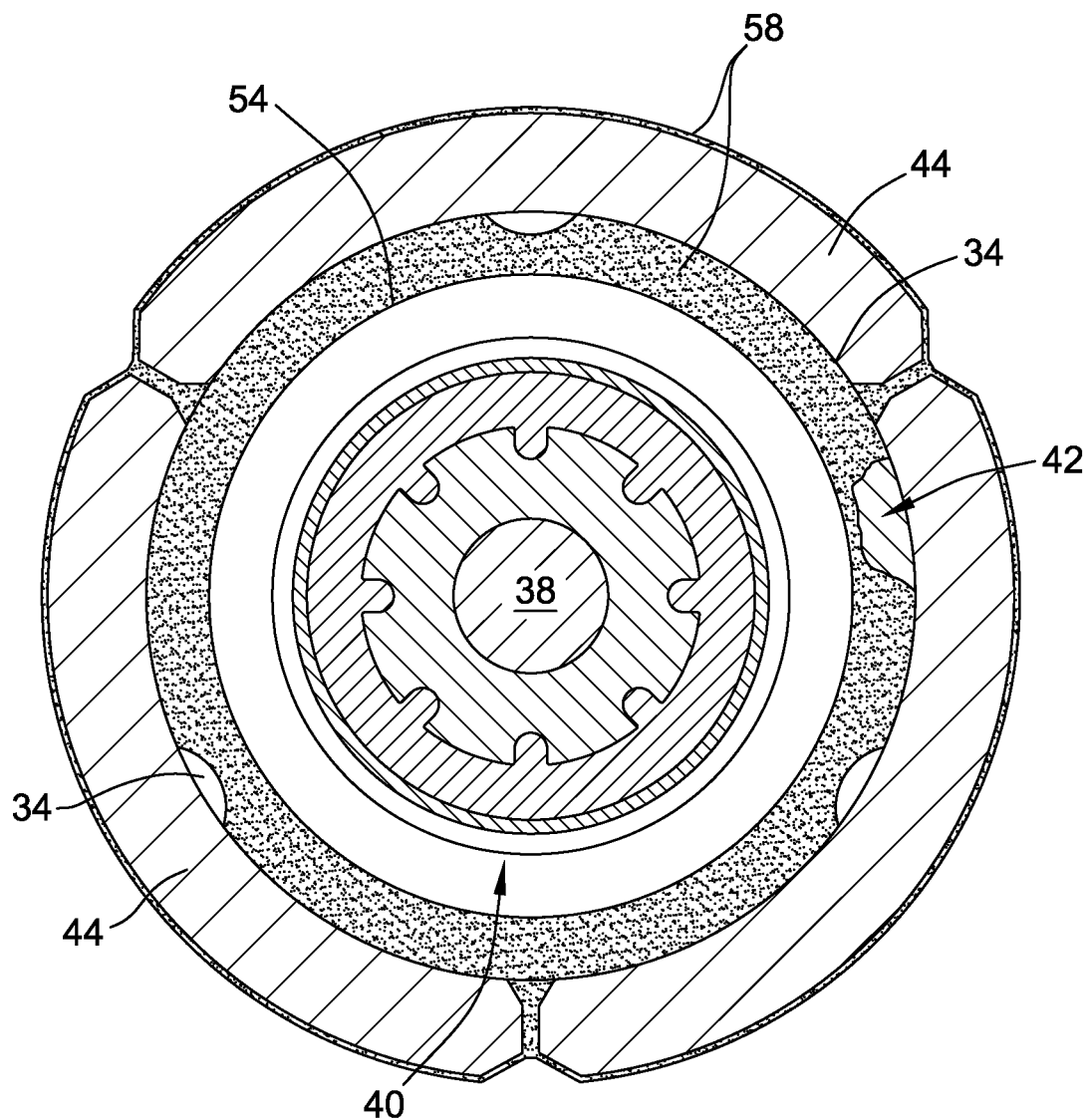
FIG. 6 is a cross-sectional view of another exemplary rotor core that may be used with the machine shown in FIG. 1.

As shown in the cut-away view of FIG. 5, sealant 58 is applied to substantially the entire gap 56 between sleeve inner diameter 54 and sleeve outer diameter 52. Alternatively, sealant 58 is applied to only a portion of gaps 56 such that there is not a fluid pathway from sleeve inner diameter 54 to sleeve outer diameter 52 via gaps 56 (e.g., in a thin, continuous line around a circumference of sleeve 42). As such, seal 58 blocks any passage through gaps 56 between inner diameter 54 and outer diameter 52. In the exemplary embodiment, any sealant 58 applied to sleeve inner diameter 54 and/or sleeve outer diameter 52 is removed such that there is substantially no sealant 58 on the surface of sleeve inner diameter 54 and/or the surface of sleeve outer diameter 52. Removal of some types of sealant 58 from these surfaces may facilitate stronger rotor construction and/or adhesion of magnets 44 to sleeve 42. Alternatively, sealant 58 is applied to the surface of sleeve inner diameter 54, the surface of sleeve outer diameter 52, or both (not shown). As such, some types of sealants 58 may facilitate stronger rotor construction and/or adhesion of magnets 44 to sleeve 42. In addition, as shown in FIG. 6, sealant 58 may be applied to substantially the entire surface area of permanent magnets 44 to further facilitate preventing air and moisture from reaching adhesive 34. Further still, sealant 58 may be applied to substantially the entire surface area of rotor core 36 to further facilitate preventing air and moisture from reaching adhesive 34 or other portions of rotor core 36.

A method of assembling rotor core 36 and rotor sleeve 42 is described herein. A plurality of laminations 50 are stamped from a blank (not shown) and stacked to form rotor sleeve 42 having outer diameter 52, inner diameter 54, and gaps 56 between adjacent laminations 50. Sealant 58 is applied to at least one of gaps 56 to seal gaps 56 and prevent a passageway for air and moisture to travel between sleeve inner diameter 54 and sleeve outer diameter 52. For example, sealant 58 may be sprayed into gaps 56 and/or brushed into gaps 56. Alternatively, or in addition, sleeve 42 may be dipped into a bath of sealant 58 and/or sleeve 42 may be rolled in a shallow bath of sealant 58 to apply sealant 58 to gaps 56. However, any suitable method for applying sealant 58 to gaps 56 may be used that enables rotor core 36 to function as described herein. In the exemplary embodiment, sealant 58 is applied to substantially the entire gap 56 between sleeve inner diameter 54 and sleeve outer diameter 52. In the exemplary embodiment, any sealant 58 remaining on the surface of inner diameter 54 and/or the surface of outer diameter 52 is removed such that substantially no sealant 58 remains on the surface of inner diameter 54 and/or the surface of outer diameter 52. Alternatively, sealant 58 is applied to the surface of inner diameter 54 and/or the surface of outer diameter 52 (or not removed). Sealant 58 is then dried and/or cured (e.g., heat cured, air cured, etc.) such that a permanent seal is formed in gaps 56, the surface of sleeve outer diameter 52, and/or the surface of sleeve inner diameter 54.

At least one permanent magnet 44 is coupled to sleeve outer diameter 52 by adhesive 34, and sleeve 42 is coupled to hub 40 to form rotor core 36. Shaft 38 is coupled to hub 40 to form rotatable assembly 20. In addition, or alternatively, sealant 58 is applied to substantially the entire surface area of permanent magnet 44 and/or substantially the entire surface area of completed rotor core 36. The formed seal facilitates preventing air and moisture from reaching adhesive 34 and degrading or weakening the bond between permanent magnet 44 and rotor sleeve 42.

Exemplary Experiment

Various laminated sleeve rotors were tested for long term magnet retention. Different sealants were applied to laminated sleeves, which were subsequently assembled into rotor cores with magnets. Additionally, sealant was applied over magnets and exposed rotor outer surfaces on different groups of rotor assemblies. Also tested was an aluminum cast PSC style rotor with glued-on magnets. Uncoated, laminated sleeve rotors and purchased solid sleeve rotors were used as control groups. The rotors were subjected to a thermal/humidity cycle and a spin test was then performed to destruction rpm to compare performance among the rotor groups.

Laminated rotor sleeves were obtained and sorted into groups. Group A sleeves were left uncoated as controls and sealants were applied in various ways to sleeve Groups B through L. No sealants were purposely left on the rotor core outside surfaces because it was intended that the acrylic adhesive still adhere directly to the rotor core surface and not to another material when bonding the magnets. Sleeve Groups A through L were then assembled into rotors. Solid sleeve control Group M rotors were also assembled. Four additional groups of laminated sleeve rotors were assembled: Groups N and P had sealant/coatings applied over the magnets and rotor core exterior surfaces, Group CG was an unmodified control group, and Group VB rotors were sealed in plastic bags. Final Group Q was a quantity of PSC cast form G aluminum rotors. All rotors were subjected to the thermal/humidity cycling and spin tested.

The Group A laminated sleeve control group was tested and resulted in one failure at 9660 rpm and the next highest failure at 3780 rpm. For comparison purposes to the other groups, 9660 value was ignored in the Cpk and mean rpm calculations, which has the effect of lowering the mean rpm, but raising the Cpk due to less variability. The Cpk value and mean rpm for control Group A were used as benchmarks to judge the effectiveness of sealants used for test Groups B through L.

Group B sealant included Valspar® clear varnish thinned with xylene and placed in a tray. Each sleeve was roll dipped, which coated all exposed surfaces including the inner diameter. The outer diameter surface was rolled on paper towels to substantially remove the varnish, and scallops and end surfaces were wiped with paper towels. The varnish was heat cured in a gas oven at 266° F. for two hours.

Group C sealant included Loctite® 290, which is an anaerobic wicking grade thread locker. The sleeves were rolled through a shallow pool to wick material through the laminations. The sleeves were left overnight for curing, then wiped with paper towels to substantially remove uncured sealant from all external surfaces.

Control Group CG rotors were built with laminated sleeves from the same time frame as Group A, but were completed as rotor assemblies immediately while Group A rotors were not assembled until Groups B through L were completed (a time delay of several weeks).

Group D sealant included Humiseal® UV40. The material was brush painted on the sleeve inner diameter and cured with UV light.

Group E sealant included Loctite® Resinol RTC, which is a casting porosity sealant. Special equipment was used that cleaned, vacuumed impregnated, cured, and re-cleaned the rotor sleeves.

Group F sealant included United Duct Sealer®, which is a high bond strength sealant for low to high pressure HVAC metal duct systems. The sealant was applied from a caulking gun cartridge and spread on the sleeve inner diameter.

Group G sealant included Sili-Thane® 803, which is a silicone and polyurethane sealant. The sealant was applied from a caulking gun cartridge and spread on the sleeve inner diameter.

Group H sealant included Seymour® Rapid Seal, which is a rubberized sealant. The sealant was applied from a spray can to the sleeve inner diameter.

Group J sealant included Krylon® clear polyurethane. The sealant was applied from a spray can to the sleeve inner diameter and air dried.

Group K sealant included Dupli-Color® gray filler/primer, which is an automotive filler/primer. The sealant was applied from a spray can to the sleeve inner diameter.

Group L sealant included Glyptal® 1201 Red. The un-thinned sealant was brush painted on the sleeve inner diameter and air dried.

Control Group M included the solid sleeve control group. Two rotors failed at 6600 rpm and 6900 rpm, respectively. Group M rotors acted as control samples against test Groups B through L due to similar vintage laminated rotor sleeves, magnet lots, glue lots, and assembly and glue process time frames.

Group N sealant included Glyptal® 1201 Red. The rotor assemblies were roll dipped in the sealant thinned with xylene, but the sealant did not appear to wick into the magnet gaps to reach the rotor sleeve. The rotor assemblies were rolled on towels to remove excess sealant from the outer magnet surfaces.

Group P sealant included Valspar® varnish. The rotor assemblies were roll dipped in sealant thinned with xylene. The rotor assemblies were rolled on towels to remove excess sealant form the outer magnet surfaces.

Group Q included production PSC form G aluminum cast cores.

Group VB included rotor assemblies heat sealed in plastic bags. The rotors were built at the same time as Control Group CG and sealed with ambient air and humidity.

Group VB plastic bagged rotors had the best testing performance. All rotors spun to 10,000 rpm without any magnet retention failure. The rotors were in the same environmental chamber as the other test groups, but were subjected only to the temperature cycling because of the sealed bags. The rotor and shaft surfaces were completely rust free after cycling, illustrating that preventing high moisture exposure to the laminated sleeve and adhesive greatly improves magnet retention.

Group M had the second best testing performance with two rotors failing at 6600 rpm and 6900 rpm while the remainder spun to 10,000 rpm without failure. Performance was better than laminated sleeve Control Group A, and since Groups M and A had similar magnet lots, glue lots, and assembly and glue process time frames, the performance difference was attributed to sleeve construction.

Sealants applied to laminated sleeves that were successful in improving magnet adhesion included Groups B, C, E, L and J. The remaining sealants either performed poorly or were not further considered due to various issues. The testing concluded that the bagged rotor Group VB demonstrated that high humidity/moisture is the primary factor affecting magnet retention. Five groups of sealants showed improvement over Control Group A.

As discussed above, adhesive bonds between permanent magnets and laminated rotors may weaken or degrade after exposure to some environments. The systems and methods described herein are directed to laminated rotors with improved magnet adhesion and moisture resistance. A sealant is applied into the gaps between adjacent laminations to facilitate preventing air and moisture from traveling through the gaps and affecting the adhesive bond. The sealant may also be applied to other portions of the laminated rotor or to the entire laminated rotor itself to facilitate sealing the rotor and its components from the environment.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A moisture resistant rotor sleeve comprising:
   a plurality of stacked laminations forming a sleeve having an outer periphery, an inner periphery, and spaces between adjacent laminations;
   an adhesive layer applied directly to said outer periphery;
   at least one permanent magnet coupled to said adhesive layer; and
   a sealant applied to said inner periphery and within said spaces between said adjacent laminations, wherein said outer periphery is free of said sealant, wherein said sealant seals said spaces to prevent fluid from reaching the adhesive layer by traveling through said spaces of said sleeve between said inner periphery and said outer periphery.

2. The rotor sleeve of claim 1, wherein said sealant occupies substantially the entire space between said adjacent laminations from said inner periphery to said outer periphery.

3. The rotor sleeve of claim 1, wherein said sealant facilitates preventing fluid from reaching the interface between said outer periphery and said adhesive layer to increase the integrity of the coupling said permanent magnet and said adhesive layer.

4. The rotor sleeve of claim 1, wherein said sealant is one of a varnish, an anaerobic wicking grade thread locker, a casting porosity sealant, a polyurethane, and an enamel paint.

5. A rotor comprising:
   a shaft;
   a hub coupled to said shaft;
   a plurality of stacked laminations forming a sleeve having an outer periphery, an inner periphery, and spaces between adjacent laminations, said sleeve coupled to said hub;
   an adhesive layer applied directly to said outer periphery;
   at least one permanent magnet coupled to said adhesive layer; and
   a sealant applied to said inner periphery and within said spaces between said adjacent laminations, wherein said outer periphery is free of said sealant, wherein said sealant seals said spaces to prevent fluid from reaching the adhesive layer by traveling through said spaces of said sleeve between said inner periphery and said outer periphery.

6. The rotor sleeve of claim 5, wherein said sealant facilitates preventing the transfer of moisture from said hub to said sleeve.

7. The rotor sleeve of claim 5, wherein said sealant facilitates preventing fluid from reaching the interface between said outer periphery and said adhesive layer to increase the integrity of the coupling said permanent magnet and said adhesive layer.

8. The rotor sleeve of claim 5, wherein said sealant is one of a varnish, an anaerobic wicking grade thread locker, a casting porosity sealant, a polyurethane, and an enamel paint.

9. A method of fabricating a moisture resistant rotor sleeve, said method comprising:
   providing a sleeve formed from a plurality of stacked laminations, the sleeve having an outer periphery, an inner periphery, and spaces between adjacent laminations;
   applying an adhesive layer to the outer periphery of the sleeve;
   coupling at least one permanent magnet to the adhesive layer; and
   applying a sealant in the spaces between adjacent laminations and to the inner periphery to form a sealed sleeve, wherein the outer periphery of the sealed sleeve is free of sealant, wherein the sealant facilitates sealing the spaces between adjacent laminations to prevent fluid from reaching the adhesive layer by traveling through the spaces of the sleeve between the inner periphery and the outer periphery.

10. The method of claim 9, wherein applying the sealant comprises at least one of spraying the sealant into the spaces between adjacent laminations and onto the inner periphery, dipping the sleeve in the sealant, brushing the sealant into the spaces between adjacent laminations and onto the inner periphery, and rolling the sleeve in a shallow bath of the sealant.

11. The method of claim 9, wherein applying the sealant comprises: applying the sealant to substantially an entire surface area of the sleeve including the outer periphery and the inner periphery; and removing any sealant from the outer periphery of the sleeve before applying the adhesive layer such that the adhesive layer is applied directly to the outer periphery of the sleeve.

12. The method of claim 11, wherein applying the sealant comprises applying a sealant to prevent moisture fluid from reaching the interface between said outer periphery and the adhesive layer to increase the integrity of the coupling of the permanent magnet and the adhesive layer.

* * * * *